US007029422B2

(12) United States Patent
Newman et al.

(10) Patent No.: US 7,029,422 B2
(45) Date of Patent: Apr. 18, 2006

(54) ERGONOMICS SAFETY WARNING DEVICE AND METHOD TO PREVENT CLUTCH BURNING

(75) Inventors: Frederic M. Newman, Midland, TX (US); Kevin Northcutt, Midland, TX (US)

(73) Assignee: Key Energy Services, Inc., Houston, TX (US)

( * ) Notice: Subject to any disclaimer, the term of this patent is extended or adjusted under 35 U.S.C. 154(b) by 0 days.

(21) Appl. No.: 10/778,835

(22) Filed: Feb. 13, 2004

(65) Prior Publication Data

US 2004/0192507 A1 Sep. 30, 2004

Related U.S. Application Data

(60) Provisional application No. 60/447,343, filed on Feb. 14, 2003, now abandoned.

(51) Int. Cl.
*B60K 41/02* (2006.01)
*B60K 25/08* (2006.01)

(52) U.S. Cl. ........................ 477/175; 477/84; 180/53.6

(58) Field of Classification Search ............ 477/174–7, 477/181, 84; 180/53.6, 53.7
See application file for complete search history.

(56) References Cited

U.S. PATENT DOCUMENTS

| | | | | |
|---|---|---|---|---|
| 1,653,262 | A * | 12/1927 | Dickson | 475/146 |
| 4,377,222 | A * | 3/1983 | Sommer | 477/5 |
| 4,800,360 | A * | 1/1989 | Dunkley et al. | 74/DIG. 7 |
| 4,951,505 | A * | 8/1990 | Seiler | 73/152.45 |
| 5,360,072 | A | 11/1994 | Lange | 173/2 |
| 5,592,029 | A * | 1/1997 | Hollstein et al. | 307/9.1 |
| 5,988,299 | A * | 11/1999 | Hansen et al. | 175/52 |
| 6,079,490 | A | 6/2000 | Newman | 166/77.51 |
| 6,164,493 | A | 12/2000 | Shelton, Jr. | 222/1 |
| 6,168,054 | B1 | 1/2001 | Shelton, Jr. | 222/608 |
| 6,209,639 | B1 | 4/2001 | Newman | 166/250.01 |
| 6,212,763 | B1 | 4/2001 | Newman | 29/702 |
| 6,213,207 | B1 | 4/2001 | Newman | 166/250.01 |
| 6,241,020 | B1 | 6/2001 | Newman | 166/250.01 |
| 6,253,849 | B1 | 7/2001 | Newman | 166/255.1 |
| 6,276,449 | B1 | 8/2001 | Newman | 166/53 |
| 6,374,706 | B1 | 4/2002 | Newman | 81/57.34 |
| 6,377,189 | B1 | 4/2002 | Newman | 340/854.6 |
| 2001/0036882 | A1* | 11/2001 | Hrazdera | 477/181 |

(Continued)

FOREIGN PATENT DOCUMENTS

DE 2635612 2/1978

(Continued)

OTHER PUBLICATIONS

International Search Report, mailed Jul. 14, 2004. PCT Application Serial No. PCT/US2004/004408, filed Feb. 13, 2004.

*Primary Examiner*—Roger Pang
(74) *Attorney, Agent, or Firm*—King & Spalding, LLP

(57) ABSTRACT

This invention will therefore provide a tool to assist the rig operator in perfecting his/her rig operation skills. Disclosed herein is an apparatus and method for minimizing slippage on the drum clutch of a well service rig. A detector senses the motion of the compound when the clutch is initially engaged. If the momentum is above an acceptable level, an alarm sounds, notifying the operator to be smoother with the clutch. A tracking mechanism is disclosed so that a rig supervisor or safety person can critique the operator on the smoothness of the rig operation.

11 Claims, 5 Drawing Sheets

U.S. PATENT DOCUMENTS

| | | | | |
|---|---|---|---|---|
| 2002/0156582 | A1 | 10/2002 | Newman | 702/5 |
| 2002/0156591 | A1 | 10/2002 | Newman | 702/45 |
| 2002/0156670 | A1 | 10/2002 | Newman | 705/9 |
| 2002/0156730 | A1 | 10/2002 | Newman | 705/40 |
| 2003/0042020 | A1 | 3/2003 | Newman | 166/250.15 |

FOREIGN PATENT DOCUMENTS

| | | | | |
|---|---|---|---|---|
| DE | 3838058 | | | 5/1990 |
| JP | 358112826 | A | * | 7/1983 |
| JP | 408277915 | A | * | 10/1996 |

* cited by examiner

Figure 2 of "A Warning Device to Prevent Clutch Burning on a Well Service Rig.

Single Fast Line Rig Up

Four Line String Up

ERGONOMICS SAFETY WARNING DEVICE AND METHOD TO PREVENT CLUTCH BURNING

BACKGROUND OF THE INVENTION

After an oil rig drills a well and installs the well casing, the rig is dismantled and removed from the site. From that point on, a mobile repair unit is typically used to service the well. Servicing includes installing and removing inner tubing strings, sucker rods, and pumps. The variety of work requires a myriad of tools.

One piece of equipment that is found on almost every well service rig is a hoist system for controlling the movement of a cable attached to a traveling block. The hoist winds and unwinds a cable that is attached to a traveling block, which is ultimately used for the prime function of a well service rig: to raise and lower heavy objects, such as rods and tubing, into and out of oil and gas wells. The hoist is usually driven by a variable speed engine coupled in part to the hoist. The prime mover (engine) drives the hoist, usually utilizing a chain driven compound and an air actuated friction clutch, the drum clutch being a critical component of the overall hoist system. The clutch is frequently the most often abused component of the overall drum system. For the most part, the abuse comes from unwanted slippage, which leads to excessive wear on the clutch assembly, leading to a reduced load size the well service rig can lift, and ultimately leading to a total breakdown of the rig.

The coupling effect of a clutch is a function of both the frictional component of the clutch (coefficient of friction and cross sectional area) and the total force between the drum and the compound plates. Naturally, higher hook loads supported by the well service rig require increased coupling between the compound and the drum, thereby requiring a stronger clutch. Since well service rig clutches are commonly air actuated, the amount of air pressure being exerted on the clutch assembly is critical to it operating properly.

The life of a drum clutch on a well service rig varies in accordance to usage and operator technique. On some rigs, clutches can last over 5 years, while on others they are replaced at intervals less than 1 year. This leads to costly rig repairs and even costlier rig down time. Therefore, this industry needs a system to assist the rig operator in operating the drum clutch so as to reduce the wear on the clutch caused by operator technique.

Well service rig operation is simple in explanation, but often is difficult to perfect. When pulling out of the well bore, the traveling block is first attached to a piece of tubing in the hole. The operator then pulls the joint out of the hole by engaging the hoist clutch and applying throttle to full RPM in the engine. When the pulled joint is completely above ground—i.e. out of the well—the operator reduces the throttle, sets the slips that hold the suspended tubing left in the hole, and releases the clutch and lets the engine idle. The tong person then engages the rod tongs and starts unscrewing the above ground joint from the below ground suspended joints. The operator then applies engine RPM so as to supply hydraulic power to the tongs.

When the joint is unscrewed, the tong man reverses the tongs and pulls them away from the unscrewed joint. The rig operator then idles the engine, engages the clutch, and carefully eases the unscrewed joint out away from the suspended tubing. Once released, the rig operator disengages the clutch so that the floorhand can reach out, grab the unscrewed joint, and guide the released tubing to its birthing spot on a racking board. The operator joint is then released from the traveling block, after which the rig operator lowers the block to the floor for attachment to the next joint of tubing still in the hole, after which the process is repeated until all the tubing is pulled from the hole.

During this process, the clutch is engaged en disengaged twice, while the engine goes from idle to full throttle two times as well. Several potential problems arise if this operation is not precisely performed or if short-cuts are taken. For instance, if the engine is not allowed to idle between high RPM uses, the pipe and/or tongs can jerk, which can cause serious equipment damage and prevents a great physical danger to workers in the area. Other accelerated movements or jerking actions of the rig clutch system can also present problems to both employees and equipment. Safety of the crew is compromised when the rig is not operated in a smooth and predictable fashion, as abrupt movements with no warning to the crew can cause accidents. In addition, several high wear points on well service rigs, including clutch, drawworks, chains, sprockets, drilling lines, pad indicators, and jack stands suffer undue wear due to sudden an abrupt changes in rig operation.

In observing the actual rig operation, it is apparent the crew must work in unison with the machine and work in unison with each other. Furthermore, it is very beneficial if the process is predictable to all persons involved, so as to maximize safe operation of the rig (e.g., the workers know where to put their hands, when to step back, when to be extra careful, etc.). Breaking the routine is what causes problems with the machine and safety hazards with the workers. Because current systems are not automated to assist the rig operator in smooth operation of the rig, there is a need to provide a system that can provide this assistance to the operator, and ultimately reduce costly repairs to parts and injuries to workers.

SUMMARY OF THE INVENTION

Disclosed herein is an apparatus and method for minimizing slippage on the drum clutch of a drilling rig or a well service rig. A detector senses the motion of the compound when the clutch is initially engaged. If the momentum is above an acceptable level, an alarm sounds, notifying the operator to be smoother with the clutch. A transducer first measures engine RPM and/or compound movement to indicate engine compound momentum and/or velocity. A pressure sensor monitors air pressure supplied to the clutch bladder, indicating clutch activation. A signal encoder indicates when the rig drum is actually moving. When the clutch is engaged, a logic circuit measures compound movement to insure the velocity is below a threshold for jerking or slipping. If the logic circuit determined that the velocity or momentum of the compound is safe and low enough, it allows the operation to continue. However, if the logic circuit determines there is too much momentum or velocity and that excessive slipping or jerking is likely, it sounds an audible alarm or illuminates a light telling the operator that he/she is not operating the rig appropriately. Alternatively, instead of or in addition to alarming the operator, the logic circuit could prohibit the operator from operating the hoist at all. In an alternative embodiment, when the logic circuit finds that the operator is attempting to operate the rig inappropriately, the logic circuit records a pulse signal in a data storage device to indicate the faulty rig operation.

DESCRIPTION OF ILLUSTRATIVE EMBODIMENTS

Figure 1:
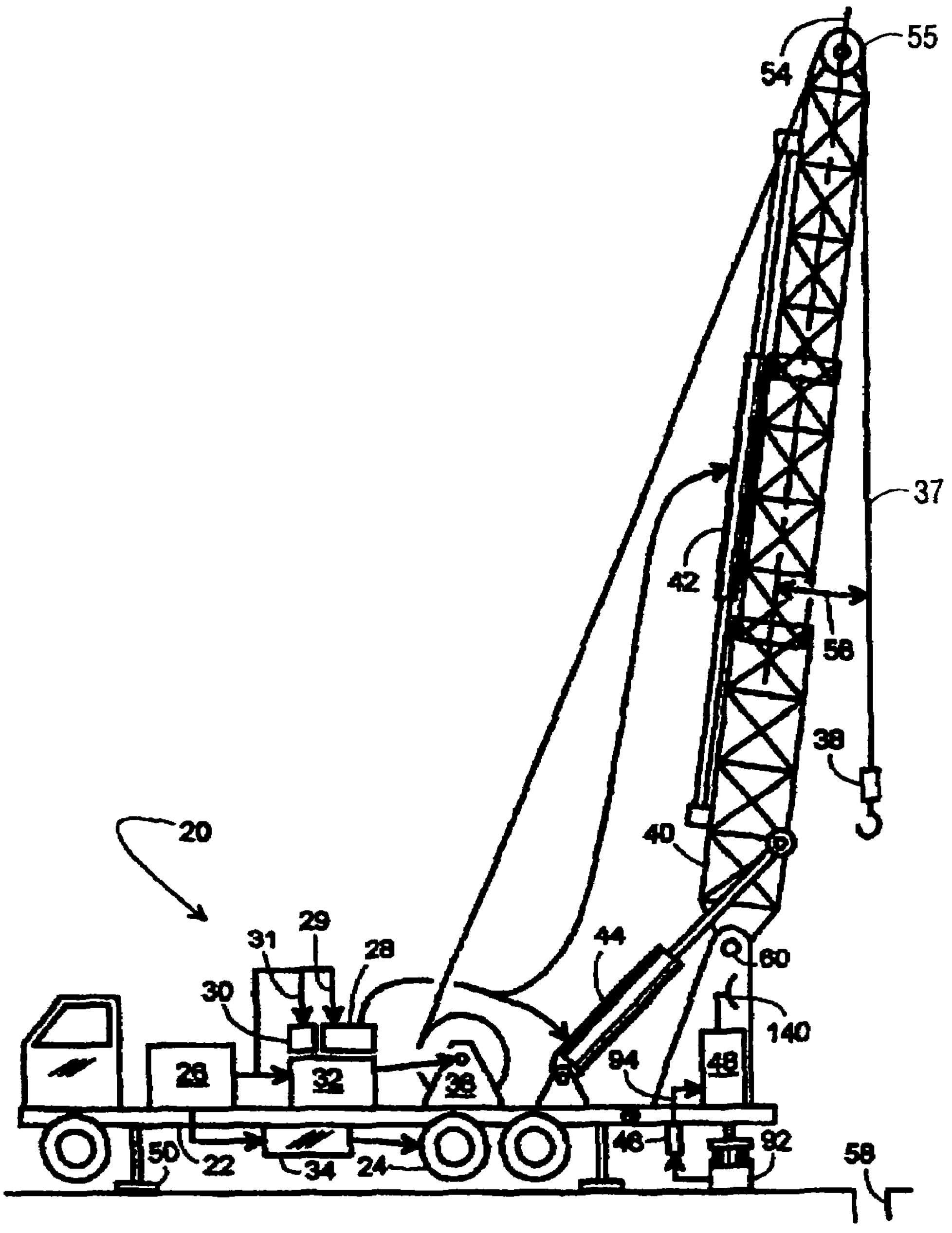
FIG. 1 illustrate the basic components of a well service rig.

Referring to FIG. 1, a retractable, self-contained workover rig 20 is shown to include a truck frame 22 supported on wheels 24, an engine 26, an hydraulic pump 28, an air compressor 30, a first transmission 32, a second transmission 34, a variable speed hoist 36, a block 38, an extendible derrick 40, a first hydraulic cylinder 42, a second hydraulic cylinder 44, a monitor 48, and retractable feet 50. Engine 26 selectively couples to wheels 24 and hoist 36 by way of transmissions 34 and 32, respectively. Engine 26 also drives hydraulic pump 28 via line 29 and air compressor 30 via line 31. Air compressor 30 powers a pneumatic slip (not shown), and hydraulic pump 28 powers a set of hydraulic tongs (not shown). Hydraulic pump 28 also powers hydraulic cylinders 42 and 44 that respectively extend and pivot derrick 40 to selectively place derrick 40 in a working position (FIG. 1) and in a retracted position (not shown). In the working position, derrick 40 is pointed upward, but its longitudinal centerline 54 is angularly offset from vertical as indicated by angle 56. This angular offset 56 provides block 38 access to a well bore 58 without interference from the derrick framework and allows for rapid installation and removal of inner pipe segments, such as inner pipe strings 62 and/or sucker rods.

The engine 26 is typically rated at or above 300 horsepower, and is connected to an automatic transmission 32, which usually consists of 5 or 6 gears. The automatic transmission 32 is connected to a right angle drive that moves a compound of chains and sprockets, which in turn drive the tubing drum clutch via a series of sprockets. When an operator desires to pick up a load and pull it out of the hole, the clutch is engaged between the drum and the compound output plate by applying air pressure. Frictional force then transfers the rotating energy from the compound to the tubing drum. As the drum rotates, it spools up or releases the drilling line, which in turn causes the traveling blocs to move up or down, respectively, lifting or lowering the load out of the hole.

The objective is to transfer power from the engine directly to the tubing drum without undue wear and tear on moving parts as well as minimum loss of energy or speed. The engine is running at all times during the rig operation, and this turning energy is transferred to the compound via the torque converter, transmission, right angle drive, and compound. The power train design is intended for the torque converter to take all the slippage, keeping slippage on the drum clutch to a minimum.

Figure 2:
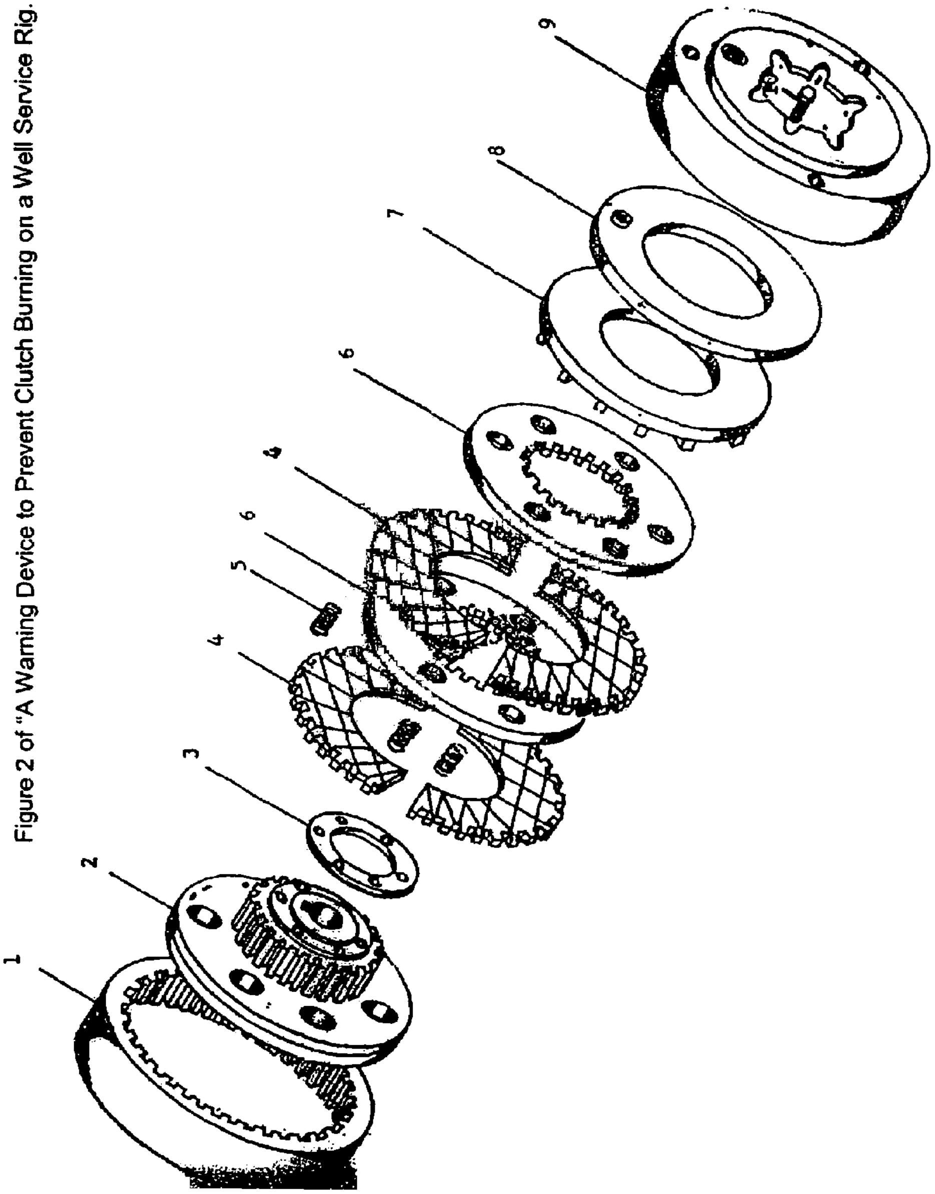
FIG. 2 shows the basic parts of a drum clutch.

Referring to FIG. 2, the basic component parts of a clutch are shown. Air pressure is applied to rubber bladder 8 which forces pressure plates 7 and 6 to compress clutch friction disks 4 into plate 2, thereby causing the rotary motion of the compound to be transferred to the driving ring 1 which moves the hoist. The friction coupling force is represented by the following equation 1:

$$F=N*f \qquad \text{Eq. 1:}$$

Where F is the total frictional force between two objects, f is the coefficient of friction, and N is the normal pressure between the two objects. In this case, the two objects are the pressure plates 7 and 6 and the plate 2, with the friction disks 4 providing the friction. In the case of the clutch shown in FIG. 2, the normal force can be expressed by equation 2 below:

$$N=A*P \qquad \text{Eq. 2:}$$

Where A is the cross sectional area of the bladder 8 and P is the air pressure applied to the bladder. Therefore, the ultimate frictional coupling force is directly dependent upon air pressure applied to the bladder 8, making it apparent that any reduction in air pressure to the clutch causes a reduced coupling force between the compound and the tubing drum.

When heavy loads are being lifted, slippage can occur, so therefore it is incumbent on the rig operator to have every assurance that the maximum air pressure is being applied to bladder 8, or, in the alternative, at least the minimum pressure necessary to lift the load without clutch slippage. There are numerous causes that might cause the air pressure on bladder 8 to fall below an optimum value. Such causes may be low air compressor output, leakage in the air supply lines, restricted air supply lines, and/or leakage in bladder 8. Ideally the clutch engagement would only occur when the maximum amount of air is applied to the bladder, however limiting engagement to when the air pressure is only at is maximum is impractical in the real world, as this could prohibit clutch use in certain situations that could ultimately cause a safety hazard.

It is preferred to be able to transfer power directly from the engine to the tubing drum without undue wear and tear on moving parts, while maximizing drum energy and speed. The engine runs at all times during the rig operation, continuously transferring energy to the drum via the torque converter, transmission, right angle drive, and the compound. The power train design is intended for the torque converter to take all slippage, while trying to eliminate slippage on the drum clutch.

Figure 3:
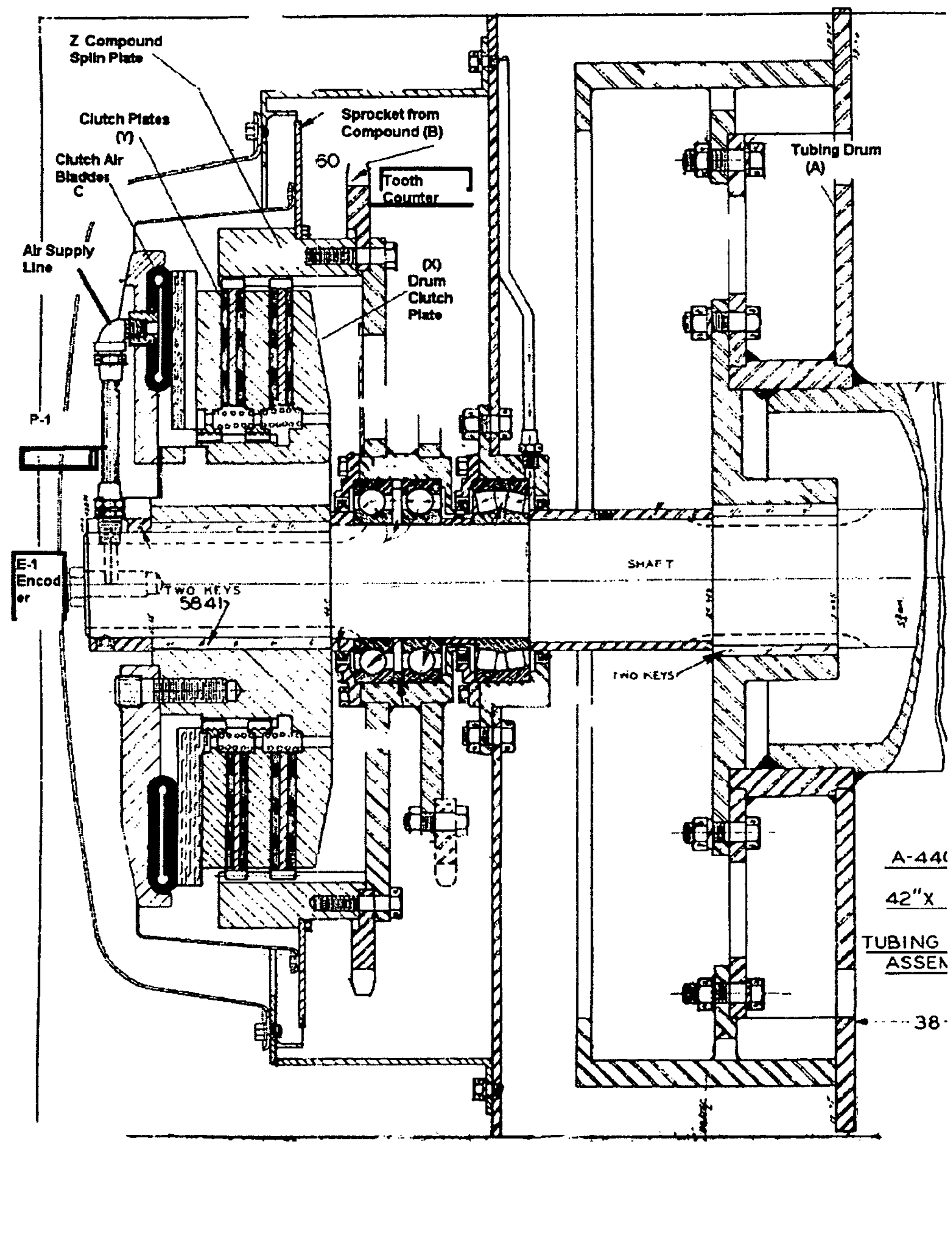
FIG. 3 shows a detailed drawing of how a drum clutch works.
Figure 4:
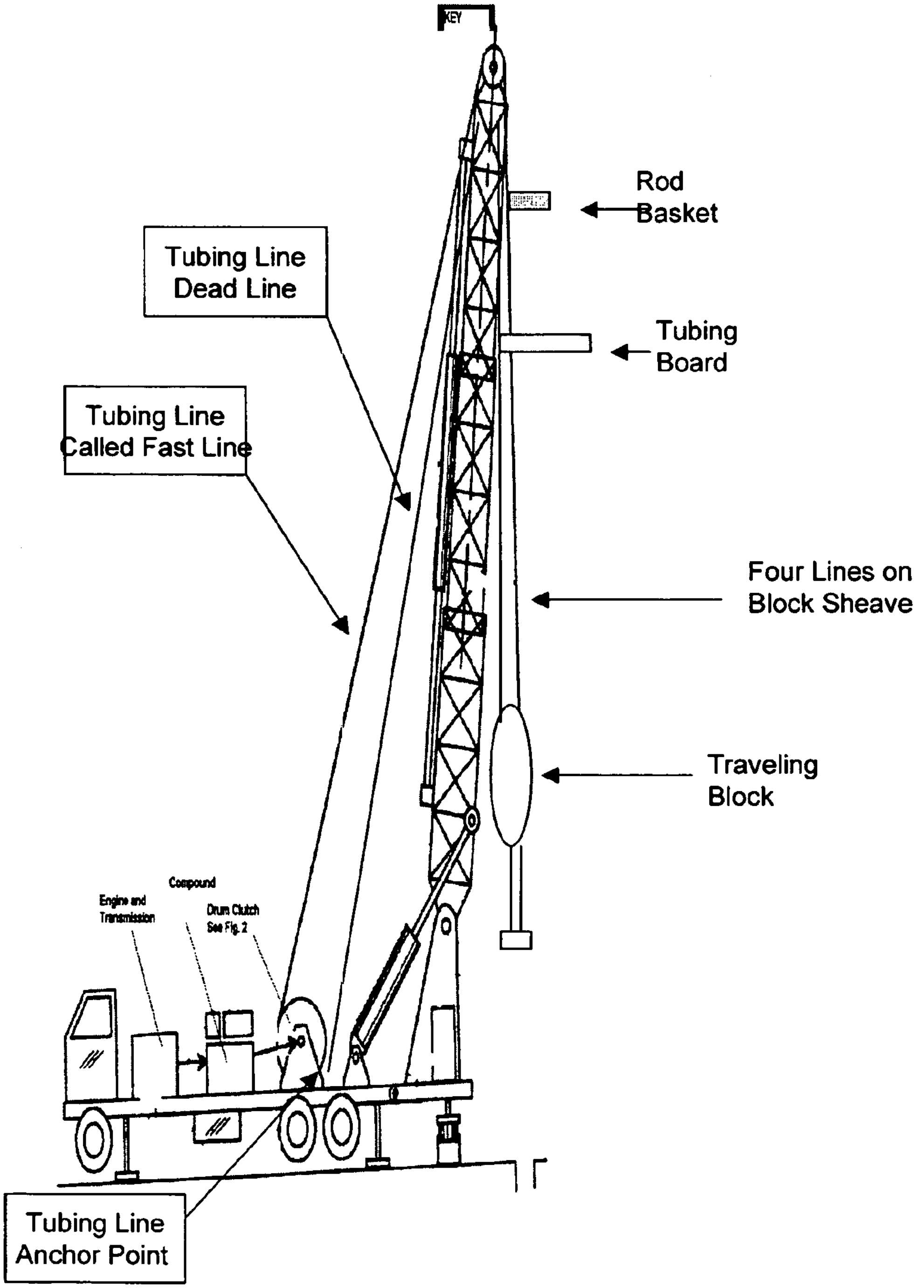
FIG. 4 shows an overview of the present invention.

Referring to FIG. 3, it can bee seen that when tubing drum A is stopped (i.e. blocks are not moving), and the compound Z is turning (i.e. engine is running and transmission is in gear), engaging the clutch by inflating bladder C will cause slippage between the drum clutch plate X, clutch pads Y, and the sprocket compound plate Z. When the clutch is engaged, one of two things usually happens. First, if the engine is at low RPM, the chain driven compound comes to an abrupt stop and the torque converter in the transmission stalls out, minimizing clutch slippage. When RPM is applied by the operator, the torque converter starts with high slippage, gradually and smoothly moving the drum. On the other hand, if the engine is at high RPM, the kinetic energy of the engine, transmission, and compound is transferred to the tubing drum causing the blocks to jump. This is the case of severe abuse and closely akin to popping the clutch in an automobile and spinning the tires.

Since the tubing drum is stopped and the compound is turning on every connection, proper engagement of the clutch is critical to both equipment life and the safety of the crew. Ideally, clutch engagement would occur when both the compound and drawworks are both at a full stop. This would eliminate any slippage, but this is not a practical solution as it would require shutting down the engine at each connection or adding a brake to the drive line or compound to stop movement below some specified minimum RPM.

By design, the transmission's torque converter should absorb the slipping motion of the drive train from the engine to the tubing drum. To operate safely and to operate the rig as it is designed, it is therefore very important that the torque converter, and not the drum clutch, be used to absorb any slippage.

Figure 5:
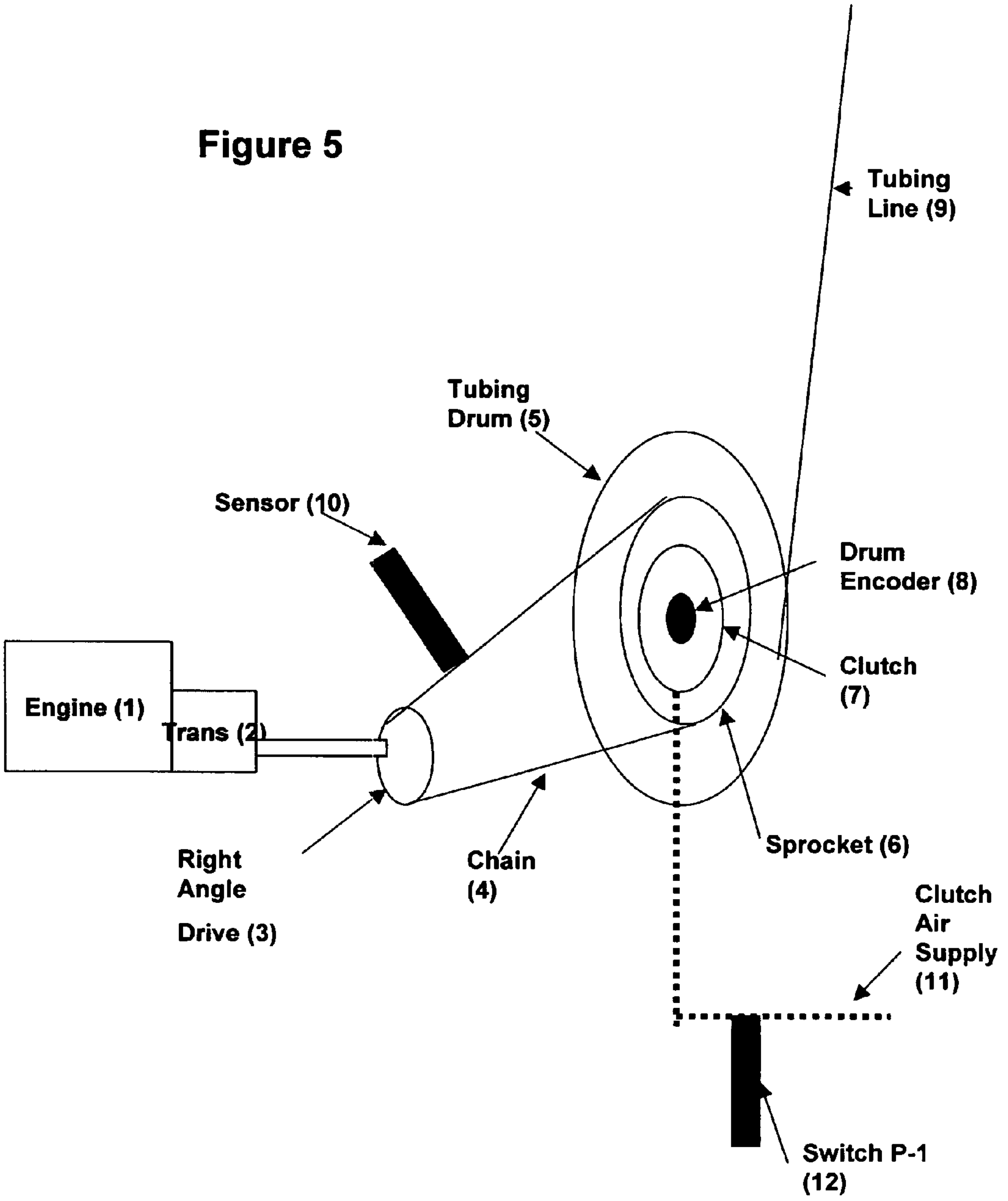
FIG. 5 illustrates one embodiment of the present invention.

Disclosed herein is an apparatus and method for minimizing slippage on the drum clutch of a well service rig. A detector senses the motion of the compound when the clutch is initially engaged. If the momentum is above an acceptable level, an alarm sounds, notifying the operator to be smoother with the clutch. Referring to FIG. 5, an RPM sensing device (10) is attached to one moving part of the drive train. This could be an actual measurement of engine RPM, or a tooth counter on a gear, such as a Hall or magnetic counter mounted near chain sprocket 6. A pressure sensing switch 12 is mounted on the clutch air supply line 11, indicating when air is applied to the bladder. This is indicative of clutch activation. Alternatively, pressure sensing switch 12 could be a pressure transmitter, which measures the actual pressure supplied to the drum clutch.

A signal generator 8, possibly an encoder that generates pulses based on the tubing drum movement, indicates when the drum is actually moving. Such a signal generator 8 could be a magnetic pick-up device or other electrical output type sensor is operatively situated adjacent to a rotary part of the cable hoist or crown wheel assembly that produces electrical impulses as the part rotates. Alternatively, a photoelectric device is used to generate the necessary electric impulses. These electrical impulses are conveyed to electronic equipment that counts the electrical impulses and associates them with a multiplier value, thereby determining the position of the traveling block. Other methods of indicating drum movement are just as useful to the present invention, such as a quadrature encoder, an optical quad encoder, a linear 4–20 encoder, or other such devices known in the art. The means of sensing drum movement is not important to the present invention, however it is important to know if the drum is rotating.

Switch 12 (either normally open or closed) sends a signal to a logic circuit when air is being applied to the clutch, and, therefore, signaling clutch engagement. The logic circuit measures compound movement (engine RPM or tooth count) to insure the velocity is below a threshold for jerking or slipping. If the logic circuit determined that the velocity or momentum of the compound is safe and low enough, it allows the operation to continue. However, if the logic circuit determines there is too much momentum or velocity and that excessive slipping or jerking is likely, it sounds an audible alarm or illuminates a light telling the operator that he/she is not operating the rig appropriately. Alternatively, instead of or in addition to alarming the operator, the logic circuit could prohibit the operator from operating the hoist at all. In this embodiment, the logic circuit sends an "engine idle" signal to an engine idle solenoid that holds the engine in an idle state. In other words, when activated, the engine idle solenoid prevents the operator from operating the engine at high RPMs, which causes the converter to remain in stall. This embodiment provides further protection against the aforementioned unwanted clutch slippage and jerking actions.

In an alternative embodiment, when the logic circuit finds that the operator is attempting to operate the rig inappropriately, the logic circuit records a pulse signal in a data storage device, including, for example, a computer, data recorder, CREW box storage device, or other storage device. This pulse signal indicates the number of times the clutch was engaged and operated at a point other than at or above the minimum acceptable momentum or velocity value. By monitoring the number of instances at which the clutch was engaged at less than optimum conditions, the rig supervisor or other person can critique and train the rig operator on proper clutch operation.

This process provides many advantages to operating a well service rig. First, tubing and rods, when suddenly disengaged and jerked up, have a tendency to sway or swing wildly and randomly. A disengaged joint has been known to swing and hit the floor man on the rig, causing severe injury and sometimes even death. The jerking movement of tubing, meaning having a high tension in the drill line followed by an immediate release of that tension, tends to shorten the life of a stranded line, as the lines are subject to bending and torque forces that it was not designed to handle. Jerking movements can also induce harmful harmonics into the line, which is transmitted over the rig crown and back to the line weight indicator. These harmonics could loosen the "C" clamp on a typical line indicator, resulting in the sending unit being knocked off. Historically, the falling off action has been responsible for many past rig incidents, including a fatal injury to a rig operator. Finally, jerking can cause irreparable damage to the threads of rods and tubing, and may even cause the rods or tubing to break and fall down into the hole, both of which cause serious damage to well equipment.

Although the invention is described with respect to several embodiments, modifications thereto will be apparent to those skilled in the art. For example, while the embodiments disclosed herein pertain to a mobile well service rig, this invention is equally applicable to the operation of a stationary oil drilling rig, and it is well within the skill of the art to adapt the described embodiments to an oil drilling rig. Therefore, the scope of the invention is to be determined by reference to the claims which follow.

What is claimed is:

1. An apparatus for minimizing slippage on a drum clutch, comprising:

- a means for sensing the RPM of an engine and/or compound;
- a means for determining when the drum clutch is engaged;
- a means for determining when the drum is moving; and
- a logic circuit for comparing the output from the RPM sensing means to a predetermined value once the means for determining when the drum clutch is engaged determines that the drum clutch is actually engaged, and if the logic circuit determines that the output from the RPM sensing means is above the predetermined value, the logic circuit prevents a well service rig operator from engaging the clutch.

2. The apparatus of claim 1, wherein the means for sensing the RPM of an engine and/or compound is selected from the group consisting of an engine RPM measuring device and a tooth counter on a gear.

3. The apparatus of claim 1, wherein the means for determining when the drum clutch is engaged is a means for determining when air is being supplied to a bladder of the drum clutch.

4. The apparatus of claim 3, wherein the means for determining when air is being supplied to the bladder of the drum clutch is selected from the group consisting of a pressure sensing switch and a pressure transmitter.

5. The apparatus of claim 1, wherein the means for determining when the drum is moving is a signal generator that generates pulses based on drum movement selected from the group consisting of a magnetic pick-up device, a photo electric device, a quadrature encoder, an optical quad encoder, and a linear 4–20 encoder.

6. The apparatus of claim 1, wherein if the logic circuit determines that the output from the RPM sensing means is above the predetermined value, the logic circuit activates an alarm.

7. The apparatus of claim 6, wherein the alarm is selected from a group consisting of activating an audible alarm or illuminating a light.

8. The apparatus of claim 1, wherein the logic circuit activates an engine idle solenoid that prevents the operator from increasing a throttle on the engine.

9. The apparatus of claim 1, further comprising a memory recording device, wherein the logic circuit records a pulse signal to the memory recording device when an operator attempts to engage the clutch when the engine and/or compound RPM is above the predetermined value.

10. The apparatus of claim 1, wherein the drum clutch is a well service rig drum clutch.

11. The apparatus of claim 1, wherein the drum clutch is an oil drilling rig drum clutch.

* * * * *